Feb. 15, 1944. K. RASCHIG 2,341,651
PROCESS AND APPARATUS FOR CONTINUOUSLY PRODUCING PLASTIC MASSES
Filed Jan. 18, 1940
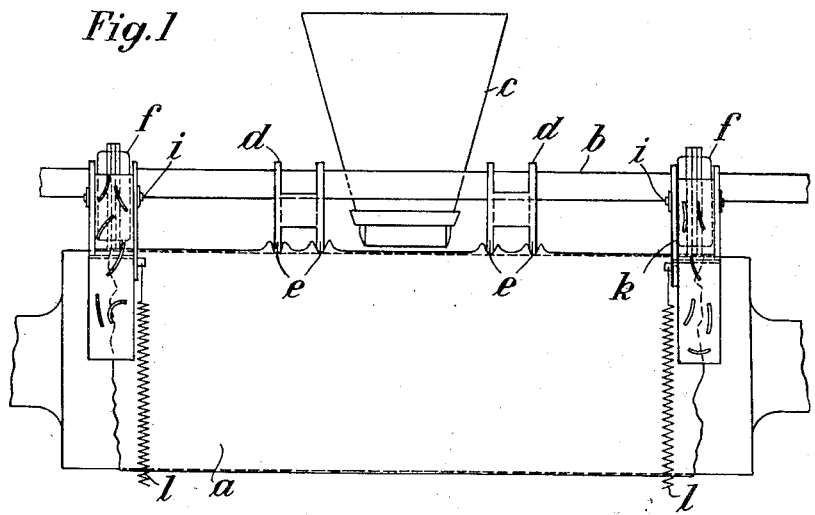
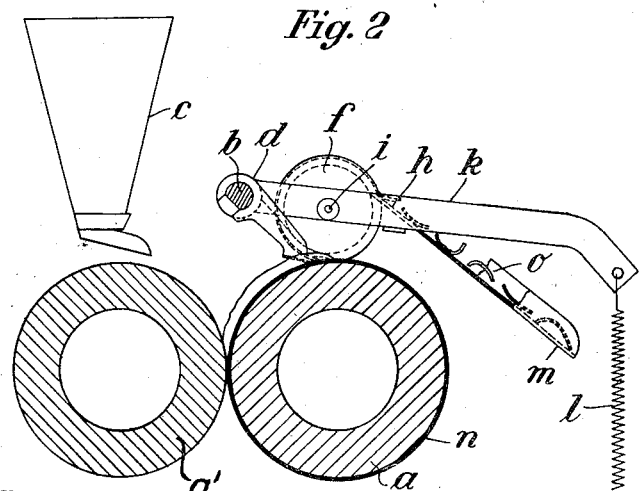
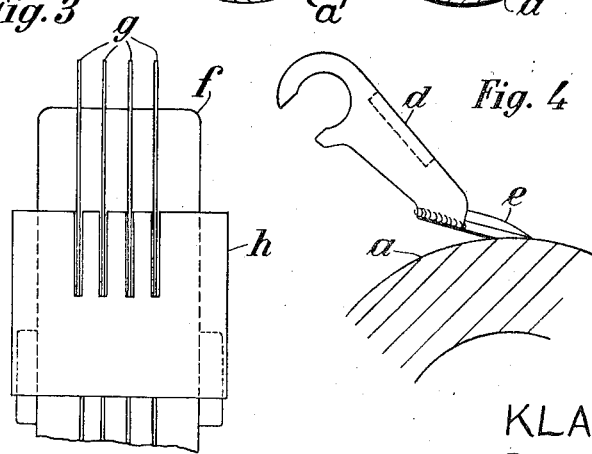
Inventor:
KLAUS RASCHIG
By
Haseltine, Lake & Co.
Attorneys.

Patented Feb. 15, 1944

2,341,651

UNITED STATES PATENT OFFICE 2,341,651

PROCESS AND APPARATUS FOR CONTINUOUSLY PRODUCING PLASTIC MASSES

Klaus Raschig, Ludwigshafen-on-the-Rhine, Germany; vested in the Alien Property Custodian Application January 18, 1940, Serial No. 314,526
In Germany January 26, 1939

4 Claims. (Cl. 18—2)

The present invention relates to a process for continuously producing plastic masses.

Under the usual heretofore accepted method of producing plastic masses and in the plasticizing of materials and mixtures involving some slight chemical reaction during the operation, a calender or mill was employed having a pair of juxtaposed rollers frictionally operating on the material and thereby heating it. Considerable labor was involved in forming a sheet or skin on the accumulating roller as it was necessary to periodically feed material into the gap between the rollers and furthermore remove the sheet therefrom by cutting with a knife and returning the partially treated mass to the rollers. Further treatment, particularly cooling from the frictional heating was both troublesome and expensive. Also the wear on the machines was excessive when this method was employed.

Continuous mixing and plasticizing of masses has also been proposed but such involves the use of a rather complicated group of machinery including conveyors, a group of mills and other equipment.

The present invention avoids the aforementioned disadvantages and employs but a single pair of calender rollers cooperating with auxiliary devices of a simple and durable nature.

Referring to the drawing:

Fig. 1 is a front elevation of a novel apparatus suitable for use in employing the method hereinafter described;

Fig. 2 is a section through the apparatus of Fig. 1;

Fig. 3 is an enlarged front elevation of one of the sheet removal devices;

Fig. 4 is an enlarged side elevation of one of the skin slitting elements or ploughs; and Fig. 5 is an enlarged section through the cutting portion of the tool of Fig. 4.

The apparatus includes an accumulator or supporting roller $a$ in the form of a hollow cylindrical body which may have its temperature regulated by passing a control fluid therethrough. Parallel and in juxtaposition thereto is counter-roller $a'$ also a hollow cylindrical body which may also have its temperature controlled in a like manner as roller $a$. The temperature of rollers $a$ and $a'$ may be maintained alike, or different or be changed during the operation in accordance with the treatment necessary to the particular plastic mixture being handled. Likewise, the distance or gap between the rollers may be varied to meet the requirements of the particular operation.

The premixed raw materials are fed onto a limited width central portion of roller $a'$ from hopper $c$ and by rotation of such roller clockwise (Fig. 2) are fed into the gap or space between the rollers at the central portion thereof.

Passing through the gap, by continued roller rotation, the supporting roller $a$ is at first encircled by a sheet ribbon about its central portion. The roller $a$ is designed and temperature controlled to pick up the material. As roller rotation continues more material is pressed on the central portion of the supporting roller squeezing the same and thereby causing skin or sheet $n$ to spread in each direction toward the ends of roller $a$.

Spaced above and extending parallel to the rollers is rod or bar $b$ which mounts tools for working the skin $n$ and additional tools to remove the same at the conclusion of the treatment for delivery in a desired condition and form for further use, which tools will be hereinafter described together with their respective operations.

As the plastic flows toward the ends of the supporting roller in the form of a skin or sheet, it is desirable to split and work the sheet not only to allow accumulated steam bubbles to escape but insure a thorough mixing. To this end a pair of knives or plows $e$ contact roller $a$ intermediate the path of the original deposit and each end thereof.

Each pair of knives $e$ are mounted by a bracket $d$ in turn carried by the rod $b$. Each blade is of an inverted Y-shape in cross-section, and is held in contact with roller $a$ through its own weight and the resistance against the skin in the slitting operation. The shape of the knives not only prevents the skin from falling back to its flattened position but works the edges to effect an increase in the mixing operation. Any number of knives may be employed but for the majority of mixes, two sets are sufficient and are preferably spaced to cut the mass into strips at least twice as wide as the distance between each pair of cutting tools.

Contacting the surface of roller $a$, adjacent each end thereof is a plurality of cutting-disks $g$ herein shown as four in each set. These disks are rotatably mounted on studs $i$ carried by arms $k$ having one end fulcrumed on the rod $b$ and having a spring $l$ attached to the opposite end through which arrangement the disks $g$ are firmly held against the roller $a$ but still shiftable to prevent injury to them in event some need arises.

Also carried by the arm k is a comb member f having portions thereof extending between the disks so that as parts of the mass are severed when coming in the range of the cutters, the comb then directs the severed portions out from between the cutters to fall into chute m. This chute may direct such portions to suitable receptacles or even to additional equipment for further processing.

With this simple and economical device employed, a wide range of plastics may be employed, for example, one having the following formula, would be typical:

| | Parts |
|---|---|
| A mixture of 85 parts Novolak resin (a condensation product of phenol and formaldehyde which is soluble and cannot be hardened) and 15 parts of hexamethylene tetramine | 40–45 |
| Wood meal | 40–55 |
| Stearic acid | 2 |
| Magnesium oxide | 1 |
| Dyestuff | 2 |

Or a rubber composition with a formula:

| | Parts |
|---|---|
| Rubber | 200 |
| Chalk | 210 |
| Antimony pentsulfide | 15 |
| Burnt magnesia | 4 |
| Sulfur | 4 |
| Stearic acid | 2 |
| Ultra-accelerators | 1.6 |

Additional plastics containing volatile constituents based on phenol-formaldehyde or cresol-formaldehyde resins may be handled as well as thermo-plastic masses based upon polyvinyl-chloride, polyacrylic-acid ester and cellulose acetate.

As a specific example of the operation of a machine embodying the disclosure herein, the machine itself had a pair of rollers 400 mm. in diameter and 1100 mm. in length. The supporting roller was driven at 18 revolutions per minute while the counter-roller was driven 21. A vibrating device delivered a phenol-formaldehyde-wood meal material to the hopper. A sheet or skin was formed in the usual manner. The gap was adjusted to 2.5 mm. The supporting roller had a temperature of 90° C. and the counter-roller 60° C. Within a short time strips with a width of 8 mm. were removed. Then to maintain uniform conditions, the supporting roller was considerably cooled while the counter-roller was only moderately cooled. A uniform production was attained, 150 kilograms per hour in the form of strips of any desired length.

The power consumed by the drive was nearly uniform at a rate of 100 amperes and never exceeded 110 amperes. The advantages are apparent when the production on the same machine under prior methods produced 40 kilograms per hour with a highly fluctuating electric current consumption reaching peaks of 200 amperes.

For efficient operation, it has been found desirable to maintain from 10% to 30% of the total mass of material on the calender in the gap. This can be raised to as much as 50% without seriously impeding the operation of the machine.

The raw material, through regulation of the rate of feed, is delivered to a central zone between the plows e worked in each direction therefrom into end zones where the material is definitely removed in the form of strips, chips, or fragments o ready for additional treatment.

I claim:

1. A method of continuously producing plastic masses upon a calender provided with two rollers having a predetermined gap between them, which includes the steps of charging raw materials and removing treated masses at longitudinally spaced zones along the rollers respectively, at least one zone being predetermined for charging the raw material on the rollers and at least one zone for definitely removing the material from the rollers, and adding at maximum a sufficient amount of raw material to that being treated so that 50% at the most of the total mass upon the calender is present in the gap formed between the two rollers.

2. Method according to claim 1, which consists in locating one zone of charging at about the middle of the calender and two separate zones of removal one at each end of the calender.

3. Method according to claim 1, which consists in locating one zone of charging at about the middle of the device and two separate zones of removal one at each end of the device, and adding a sufficient amount of raw material to the mass being treated so that the proportion of the mass present in said gap is 10% to 30% of the total mass on the calender.

4. In an apparatus for continuously producing plastic masses comprising a pair of rollers, one constituting a supporting roller and the other a counter-roller, means for slitting a sheet of plastic material formed by the rollers, said apparatus having spaced annular zones along the roller means for removing the material from the rollers, and said apparatus having tools for slitting the plastic sheet adjacent the upper surface of the supporting roller, each of said slitting tools embodying two spaced apart cutting edges and the distance between any two of said slitting tools being at least twice as great as the distance between the cutting edges of a single tool.

KLAUS RASCHIG.